United States Patent [19]
Toth

[11] 3,757,954
[45] Sept. 11, 1973

[54] TWO-WAY FILTER
[76] Inventor: Albert S. Toth, 205 W. End Ave., New York, N.Y.
[22] Filed: Dec. 15, 1971
[21] Appl. No.: 208,297

[52] U.S. Cl. .................. 210/277, 210/284, 210/290
[51] Int. Cl. ............................................ B01d 29/08
[58] Field of Search ...................... 210/80, 274, 284, 210/290, 277

[56] References Cited
UNITED STATES PATENTS
3,276,585  10/1966  Kalinske ............................... 210/80
3,680,701   8/1972  Dual ..................................... 210/80
3,260,366   7/1966  Duff et al. ............................ 210/80

FOREIGN PATENTS OR APPLICATIONS
366,614   5/1906  France ................................. 210/284

Primary Examiner—Samih N. Zaharna
Assistant Examiner—Benoit Castel
Attorney—W. Lee Helms

[57] ABSTRACT

Apparatus in the form of a vertical vessel, having two spaced and supported filter beds located at either sides of a centrally located influent member, so that water to be treated is admitted to the apparatus through said influent member and a portion of the flow is filtered by passage through the lower filter bed and the second portion is filtered by its rise through the upper filter bed, the filtered fluid, for example water, being discharged to points of collection by separate effluent conduits, controlled by control and measuring devices. Valves adapted to close and open the influent member and the effluent conduits are provided, and a valved back-wash conduit is provided at the lower area of the vessel, together with an air-pressure inlet member. The top of each filter bed is provided with a valved outlet member leading to a conduit primarily for receiving dirty fluid by back wash and for discharging it from the vessel, the influent and the first named filtered fluid effluent valves being closed and the last named outlet member valves being opened.

2 Claims, 2 Drawing Figures

Patented Sept. 11, 1973 3,757,954

TWO-WAY FILTER

The apparatus elements thus specified enables selective filtration of different sizes of suspended solids by having the larger sizes conveyed gravitationally downward, and smaller particles conveyed upward by the flow of water to the upper filter bed in a direction opposed to gravity forces, so that fine filtration can be formed in the upper bed and coarse filtration in the lower bed, with separate discharge and collection of the two separate volumes of filtered fluid.

The control and measuring devices, of which a primary one is applied to the connection for each effluent conduit. may be of known design, and which serves to prevent a high velocity of the fluid to be filtered through the filter beds, or one or more selected beds, when clean, and which condition without control would pass objectional sediment and organisms through such filtering means, and which maintain the rate of flow in accordance with the condition of the filtering mediums.

The invention will be described with reference to the accompanying drawings, in which.

Figure 1:
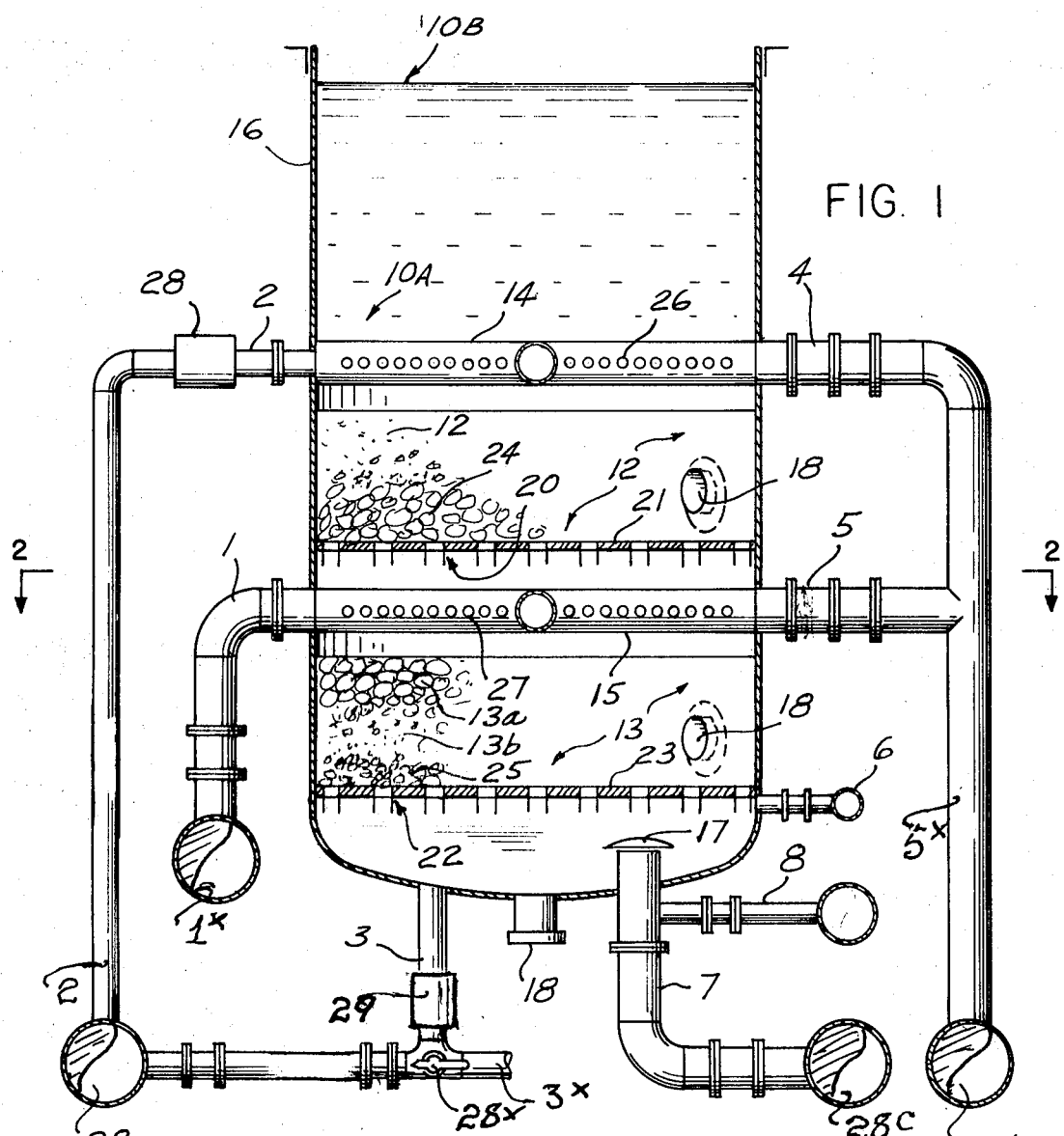
FIG. 1 is a vertical section through an embodiment of the invention.
Figure 2:
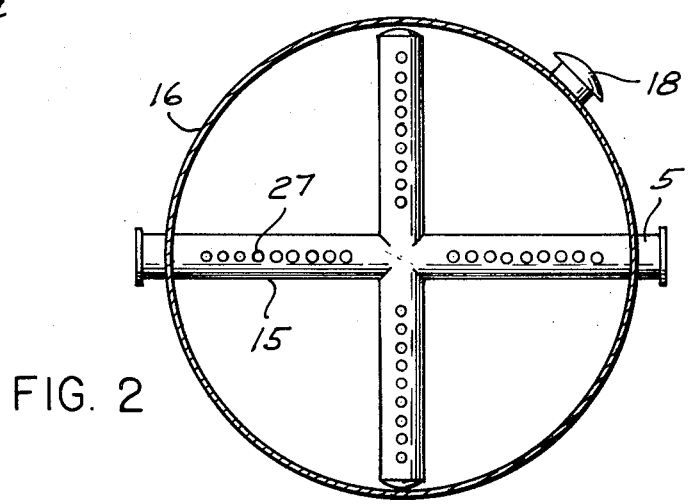
FIG. 2 is a horizontal section through FIG. 1, taken on the line 2—2 of that Figure.

Referring to the drawings, there is shown at 16 a vessel, which in the present embodiment is round in shape, but which may be rectangular or other desired shape. Within the vessel are shown two spaced filter beds. The fluid to be filtered, water as one example, enters the vessel between the two filter beds via a conduit 1 controlled by a valve 1$^x$ and enters a collector or distributor shown in FIG. 2 as a four branch structure in cross-form, at 15, the branch members being perforated as indicated at 27. The vessel holds two apertured plates, 21, for the support of the upper filter bed and 23 for support of the lower filter bed. These plates preferably carry ejection nozzles as indicated at 20 and 22.

The upper filter bed media can be graded in any suitable size from one-half inch to 0.4 mm. in diameter and preferably uniform and spherically shaped such as gravel and sand, The depth of media may vary from 24 inches to over 96 inches, depending upon the desired retention loading and filter cycle period.

The lower filter bed is preferably composed of two materials, such as anthracite and sand, and hence having different specific gravities, so that following a backwash, the lighter, but larger, media is at the top of the bed and the heavier, but smaller, media is below. The mesh diameter size of the anthracite may be from 1 mm. to 10 millimeters and the mesh size of sand may be from 0.4 mm. to 4 mm. The depth of anthracite may vary from 12 inches to 84 inches, and the sand from 12 to 84 inches, making the total lower bed depth generally less than 120 inches.

The incoming fluid to be filtered passes from distributor 15 to the top of the lower filter bed and down through the same to a discharge conduit 3 communicating with a control device at 29 later to be described herein. Also, the incoming fluid rises in the vessel and passes through the apertured (and nozzeled if desired) plate 20 to and up through the upper filter bed, 12, to conduit 2 to discharge as clarified fluid to be reused as desired. Such flow of clarified fluid generally will meet the clarified fluid led from the base of the vessel and from the lower filter bed, through conduit 3. However, when valve 28x, it being a two-way valve, is operated to shut off flow to the point of discharge of conduit 2 and to open flow to branch pipe 3x the clarified fluid from the lower filter bed can be separately collected. Thus the apparatus provides a valuable use in the cleansing of fluids containing solids, etc. in that when two different clarities of the filtered fluid is desired this can be accomplished in a single filter unit and by simple control means.

In backwashing operations, the conduits 1, 2, and 3 are shut off and conduits 4, 5, and 7 are opened. Backwash fluid, usually water, is passed under pressure through conduit 7 and meets a curved distributor plate 17, the wash fluid being passed through the apertured supporing plates 23 and 21, thence through the filter beds, the collectors 15 and 14, and to discharge conduit 5$^x$.

In a preferred backwashing action, two successive operations are employed. First, the lower filter bed is cleaned by admission of low-pressure air, through air-inlet pipe 6, and applying a low rate of backwash fluid. The dirty fluid is received within the perforated collector 15 and passed to outflow conduit 5$^x$. Secondly, and after a matter of minutes, valve control means at the discharge end of collector 15 shuts off flow from the latter to conduit 5$^x$, and the backwash rate is increased to a high flushing rate, as, for example, for five to ten minutes, to adequately clean the upper filter bed.

The cycle period between backwashes is dependent upon the suspended solids content, the depth of each filter bed, and the rate of solids accumulated therein, and, of course, the combined rate of filtration for both beds.

Water supply for backwashing is required generally at a high rate equal to 25 to 50 g.p.m. per square foot of the lower bed; but in certain deep filter bed configurations the rate required may be higher, and possibly twice these values. Backwash fluid, usually water, is applied at two rates, low rate at a fraction of the higher rate during the time that the air is being applied, and high rate after the air has been shut off. Thus the low backwash fluid rate may be in the order of 25 per cent of the high rate. In some cases the low backwash fluid rate may be eliminated, and only air used in the first step in the backwashing.

Water as utilized during the backwashing is applied under a rate up to 12 standard cubic feet per minute per square foot of only the area of the lower filter bed. The air pressure required is dependent upon the height of the apparatus, but generally is between 10 and 30 pounds per square inch gage.

Returning to the filtration procedure, as filtration proceeds simultaneously in the two filter beds and thus operating under the same hydraulic energy, when the flow is set by the flow controller, the pressure or head loss in each filter bed will tend to equalize, and as the filter beds receive solids the maximum head loss may reach 15 feet of water or other fluid being treated in both of the beds. However, filtration rates for both the upper and the lower filter beds may be set at different values in order to produce a cleaner treated fluid when both filtrates are combined, or to equalize the solids-loading to each bed, this being effected by the set controls, now to be described.

As indicated in the forepart of this specification, the flow controls of the present invention-embodiment are located at 14 for the outflow conduit 2 which is in communication with collector 26 for the upper filter bed, and at 29 for the outflow conduit for the lower filter bed. Each flow control may be of the general type of the well known Model 601 flow control marketed by BIF Division of General Signal Corporation, Providence, Rhode Island. The said control is a pre-set mechanical device for maintaining adjusted rate of fluid flow, in the present embodiment the flow of filter effluent. The setting is done by positioning of a counterweight on a graduated weight beam for automatically acting valve means controlled by the weight-beam mechanism. Changes in the fluid pressure due to building up of solids in the filter bed or beds, thus varying the fluid flow from that set by the control, causes corresponding changes in the positions of the control valve means and the said conditions are corrected automatically. Said changes in fluid flow include, of course, compared with the manually set flow-rate, a condition corrected with the velocity of the fluid through one or both of the filter beds is so high as to pass only an undesired partially-clarified fluid out of the filtering means, a condition often met with when a filtering operation with bed filters is started with the beds fairly clean.

It thus will be seen that the apparatus by nature of its operation in downward direction, as to a lower filter bed, and also in upward direction, as to an upper filter bed, with the capacity of proportioning the flow to any selected rate, enables selective filtration of different sizes of suspended solids by virtue of having larger particles gravitationally conveyed downwardly, and smaller particles conveyed upwardly by the flow of water to the upper filter bed under counter-gravity conditions. Fine filtration can be performed in one bed and coarse filtration in the lower bed within the confines of a single filter unit, and the two effluents may be combined, or discharged separately when it is desired to secure one portion of greater clarification than the other.

The apparatus may operate under gravity conditions as indicated in the drawings, the vessel top being shown open, or it may operate under pressure. It may be incorporated in a water recirculation system for cooling towers and thus at an elevation to flow directly into said cooling towers by gravity.

The elements 18 in the drawings are drain-port closures. The drawing symbol 28a indicates a valved outlet connection for conduit 2, and the symbol 28b indicates a valve outlet connection for spent backwash fluid passing through conduit 5$^x$. The symbol 28c indicates a valve inflow connection for the backwash conduit 7.

It will be understood that various modifications may be made in the elements of the apparatus shown in the drawings, and their placement, within the spirit of the invention.

Having described my invention, what I claim and desire to protect by Letters Patent, is as follows:

1. In a two-way filter for fluids, a vertical vessel, upper and lower apertured and mutually spaced supports therein and providing upper and lower areas for spaced filter beds, influent flow means adapted to discharge fluid to be clarified and intermediate said apertured supports, whereby a portion of the fluid to be treated and leaving said influent flow means, may be passed through the lower filter bed area and a second portion caused to rise through the upper filter bed area, and means for discharging clarified fluid, as an effluent, from said filter bed areas said two-way filter further comprising an apertured influent distributor within the vessel and between the filter beds, an apertured effluent receiving member within the vessel and above the upper filter bed, an effluent discharge conduit below the lower filter bed, a back-wash conduit joining the apertured influent distributor and the apertured effluent discharge member, valve means adapted to open and shut the backwash conduit and when open to permit direct flow of spent backwash fluid from the apertured influent distributor and the apertured effluent receiving member into the backwash conduit, a flow conduit from the effluent receiving member and a valve controlling said conduit, valve means controlling the influent distributor, and valve means controlling the effluent discharge member below the lower filter bed.

2. A two-way filter for fluids, constructed in accordance with claim 1, in which a perforated branched tubular member horizontally disposed intermediate the two filter bed areas constitutes the influent flow means, a second tubular member which is branched and perforated constitutes constitutes the discharge means for clarified effluent, means for admitting backwash fluid within the base of the vessel under the lower filter bed area, and backwash elements comprising a conduit extending vertically of the vessel, the branched and apertured tubular influent distributor and the branched and apertured tubular effluent discharge member extending horizontally of the vessel and directly flow-joined to said backwash conduit for simultaneous discharge of spent backwash fluid thereto.

* * * * *